(No Model.)
S. P. PARK.
BATHING ATTACHMENT FOR BIRD CAGES.
No. 276,871. Patented May 1, 1883.
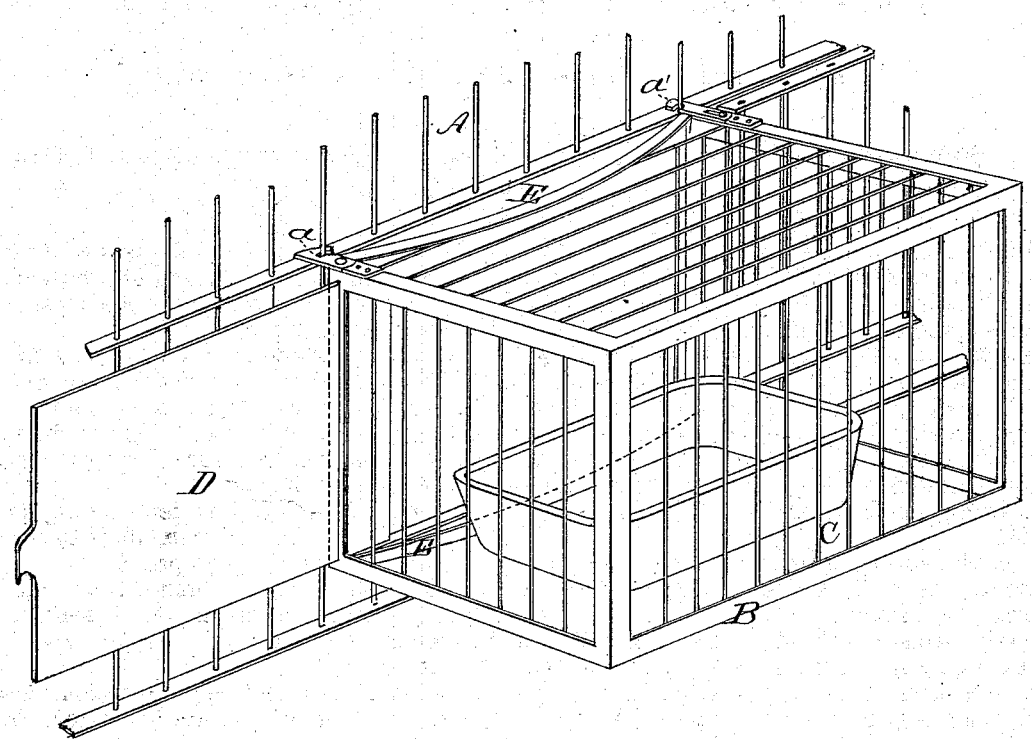
Witnesses:
Paul J. Pez
Max Hanemann
Inventor:
Sallie Peters Park.
by J. West Wagner,
attorney.

UNITED STATES PATENT OFFICE.

SALLIE P. PARK, OF WASHINGTON, DISTRICT OF COLUMBIA.

BATHING ATTACHMENT FOR BIRD-CAGES.

SPECIFICATION forming part of Letters Patent No. 276,871, dated May 1, 1883.

Application filed November 2, 1882. (No model.)

*To all whom it may concern:*

Be it known that I, SALLIE PETERS PARK, of Washington, in the District of Columbia, have invented certain new and useful Improvements in Bathing Attachments for Bird-Cages; and I do hereby declare that the following is a full, clear, and exact description of the invention, which will enable others skilled in the art to which it appertains to make and use the same, reference being had to the accompanying drawing, which forms a part of this specification.

My invention relates to improvements in attachments for bird-cages, and has for its purpose the providing of more convenient and ready means for allowing birds to bathe without soiling the cage proper, and at the same time securing the bird in safely, while the cage is being cleaned or changed, after the attachment has been removed.

In the drawing the attachment is shown in perspective as being hung to a square wire cage having its door open to allow the bird to enter the bath, the slide of the attachment being drawn back or open.

In the care of birds much annoyance is experienced from the wetting of the cage and its surroundings, occasioned by the bird's efforts to dry himself, in the manner nature has provided, after he has had the bath. To remedy this I provide a small wire bath-cage having a solid bottom and slide door, and proper hooks for attaching it to the cage proper.

In the drawing, A is the side of an ordinary bird-cage with the door thrown back.

B is the attachment, suspended from the wires of the cage by means of swinging and sliding hooks $a\,a'$, fastened to the top side rails of the smaller cage.

C is the sheet-metal bottom, having its edges turned up to form a rim for the attachment of the vertical wires of the cage, and at the same time to prevent the water that may be spilled or splashed over from the tub from flowing out and falling on the carpet.

D represents the sheet-metal sliding door, to be closed when the attachment, with the bird, is removed from the cage proper.

The horizontal upper and lower rails, E E, of the attachment are curved to allow the attachment to be used on a round as well as a square cage.

Having described my invention, what I claim, and desire to secure by Letters Patent, is—

A bathing attachment for bird-cages, constructed of wire, and sheet-metal sliding door and bottom with turned-up edges, and with auxiliary devices for suspending the same to and in front of the open door of a bird-cage, as set forth.

In testimony that I claim the foregoing as my own I have hereto affixed my signature in presence of two witnesses.

SALLIE PETERS PARK.

Witnesses:
JAMES LAWRENSON,
JAS. W. MCCORMICK.